United States Patent Office 2,774,210
Patented Dec. 18, 1956

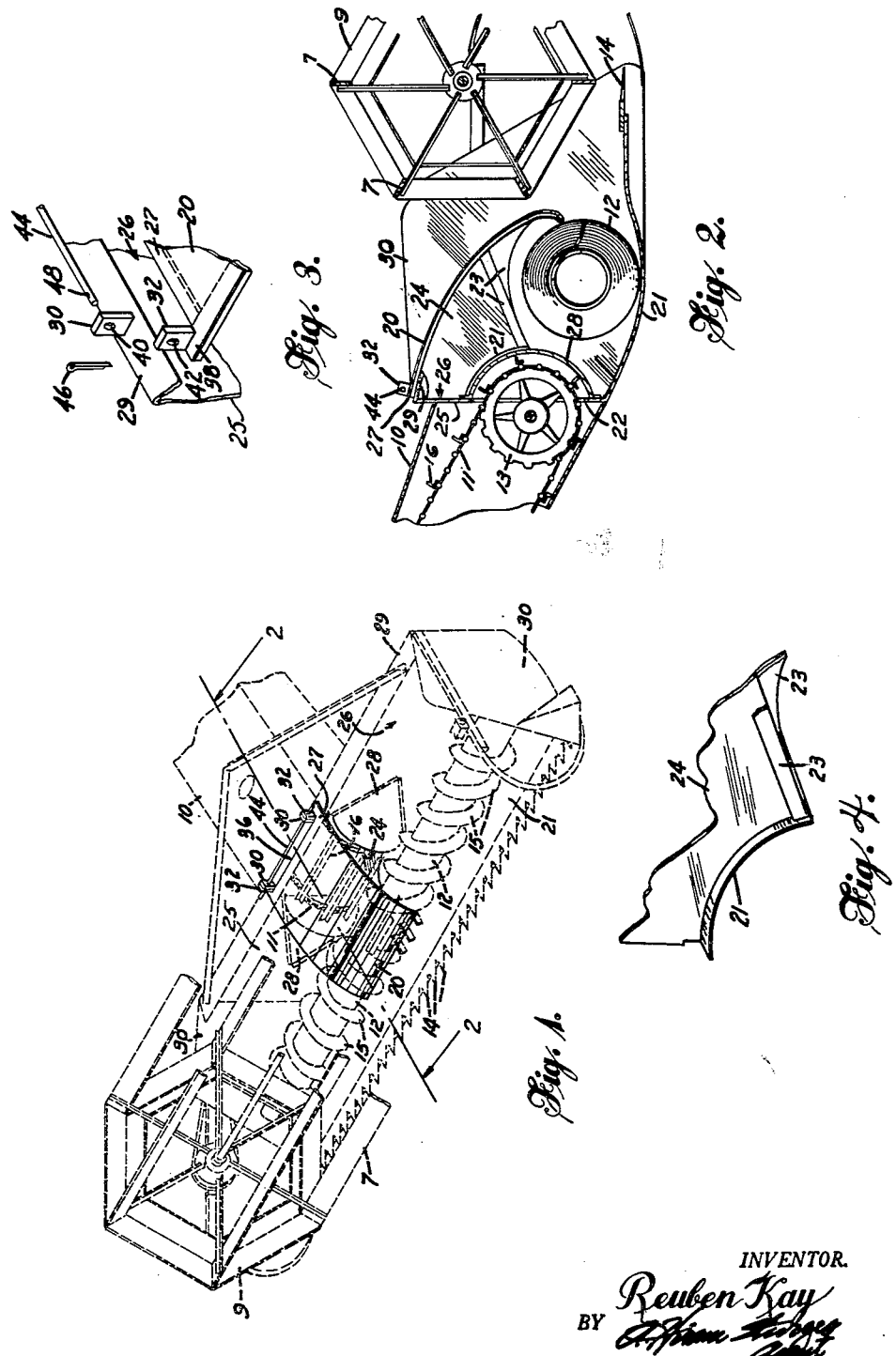

2,774,210

GRAIN SAVING SHIELD FOR COMBINES

Reuben Kay, Blair, Nebr.

Application October 15, 1953, Serial No. 386,321

2 Claims. (Cl. 56—158)

This invention relates to combines and more particularly it is an object of this invention to provide a deflector for covering the forward portion of the conveyor portion of the combine and extending downwardly across an auger disposed transversely with respect to the combine at the forward end just behind the cutting teeth whereby the deflector tends to prevent grain from being thrown outwardly of the normally open forward end of the conveyor portion onto the ground and instead to deflect it downwardly underneath the auger around the forward side of the auger, whereby the auger brings the grain to the center and it is carried upwardly on the conveyor.

Grain in a combine tends to be thrown outwardly of the forward end of the conveyor portion when the combine is lightly loaded with incoming grain. Grain comes in under the auger of a combine and next passes underneath the conveyor and the grain is carried upwardly by flights on the underside of the conveyor.

A constant pressure of air travels forwardly from the thrashing cylinder and tends to blow outwardly to the open air from the underside of the conveyor. The air rushing forwardly from the cylinder cannot rush out from the underside of the conveyor when the combine is fully loaded because grain tends to fill the place above the bed or trough of the conveyor.

However, when the grain is flowing inwardly at a lesser rate this space is not filled and the air rushing out tends to blow grain outwardly onto the ground.

A particular object of the invention is to prevent the great waste of grain which now occurs when grain is blown away, either by the downward draft from the conveyor housing or from natural wind.

The grain thus falling is almost a complete loss, even when stock are turned onto the field. This is true because the fallen grain is not in easily available condition and becomes completely unavailable after a rain.

A further and very important object of the invention is the protection of the health and comfort and efficiency of the operator from dust and chaff blown from the cut grain. As any combine operator well knows he can be subject to great discomfort and inconvenience when the wind whips grain, chaff and dust from the newly cut grain directly upon him and into his face, an instance of where this is particularly true and crucial is in the harvesting of clover.

A further object of the invention is the provision of a shield for saving grain and for protecting the operator from dust and blowing chaff which is detachably or permanently hinged. Being thus hinged, the shield can be thrown back or removed for cleaning of the area underneath, and for necessary greasing of parts.

A further object of the invention is the provision of a shield, for protection of the operator of a combine and for the saving of grain, which can be used upon the old style combine as well as the Massey Harris type shown in the drawing.

A still further object of this invention is the provision on the shield of a flange extending rearwardly from the lower edge of the shield for as complete a closure of the space between the baffles of an auger and the shield as is consistent with free rotation of the auger.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

Figure 1 is a perspective view of the device attached for use to a combine, the portions of the combine which are old being shown in dotted line.

Figure 2 is a cross section taken on the line 2—2 of Figure 1.

Figure 3 is a fragmentary detail showing the connection of the shield of the invention to the apron or scoop of a combine.

Figure 4 is a detail.

After the manner of construction of the usual combine a conveyor housing or frame 10 encloses a conveyor belt 11. The conveyor belt carries flights 16 and is activated by means of the ratchet wheel 13. The conveyor extends through an opening 22 in a substantially vertically disposed rear wall 25 of a scoop 26 or apron. The wall 25 has a horizontal flange 29 formed at the upper edge thereof and its lower end joins the rear edge of the forwardly extending bottom or floor 21 of the scoop 26. A member 28 having the formation of a portion of a cone attaches to and sets into the member 26 and has for its purpose the protection and shielding of the activated parts of the conveyor.

An auger 12 is journaled in the end portions 30 of the scoop 26. The screw flanges 15 of the auger are pitched inwardly toward the central portion of the auger from both ends, so that the grain, cut by the teeth 14 and baffled into the scoop 26 by the blade 7 of the reel 9, is carried toward and into the conveyor 10.

The above described machinery is all understood to be old. In the operation of cutting the grain and baffling it upward into the conveyor, a very considerable amount of grain is lost, as above explained, by reason of the down draft of air through the conveyor housing.

The shield 20 is made of sheet metal or the like. It curves downward as best shown in Figure 2 and forms a shield and a stop for grain thrown and blown outwardly away from the conveyor. The rearward end 27 of the shield 20 is attached to a flange 29 on the scoop 26 by means of the following device. Ears 30 stand upright as shown in Figure 3 upon the flange 29 of the scoop 26.

The shield portion 20 has cut-out portion 36 which leaves a pair of rearwardly protruding tabs 38 at each end. A pair of upstanding ears 32 are welded or otherwise fastened to the protruding tabs 38. Eye openings 40 and 42 in ears 30 and 32 respectively are placed to coincide so that a rod 44 may be inserted through both pairs of ears, one at the proximity of each lateral edge of the shield 20.

The rod 44 is secured in position by cotter pins 46 and eyes 48 or by any means removable or permanent as desired, so long as hinging relation is maintained.

The shield 20 can be raised and thrown backward being pivoted about the rod 44 to allow access to the open end of the conveyor to allow cleaning.

End wing portions 24 close off the sides of the area above the conveyor entrance, and are integral with the shield 20. The lower edge of the portion 24 is curved complimentary to the curved portion of the cone 28. A flange 21 is provided for close fitting over the edge of the cone. Struts or braces 23 are provided for reinforcement.

It will thus be seen that the objectives above stated are fully realized. The grain, which would not fall within or would be blown away from the area where it is readily caught up by the auger blades and the flights of the conveyor, is baffled back into the area, and is retrieved instead of being lost.

From the foregoing description it is thought to be obvious that, a grain saving shield for combines, constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. In a combine having a frame, a transverse auger rotatably attached to said frame, a forwardly opening scoop attached to said frame and having a transversely disposed rearward wall, said rearward wall having an upper edge and having an opening therethrough, a grain conveyor disposed behind said auger and beneath the upper edge of said rearward wall and extending forwardly and rearwardly, the forward end of said conveyor extending into said opening in said rearward wall whereby grain escapes from said forward end of said conveyor; a shield having a rearward end pivotally connected to the upper edge of the rearward wall of said scoop and extending forwardly and downwardly over the exposed forward end of said conveyor and over the central portion of said auger and partially around the forward side of said auger to direct grain downwardly to said auger for the saving of grain and for protection of the operator against blowing chaff.

2. The combination defined in claim 1 in which said shield has downwardly extending wing portions on each side thereof to further provide saving of grain.

References Cited in the file of this patent

UNITED STATES PATENTS

| | | |
|---|---|---|
| 1,934,160 | Ballentine et al. | Nov. 7, 1933 |
| 2,161,634 | Pierson | June 6, 1939 |
| 2,270,208 | Lindgren et al. | Jan. 13, 1942 |
| 2,352,257 | Dray | June 27, 1944 |
| 2,528,275 | Heth | Oct. 31, 1950 |
| 2,599,438 | Downing et al. | June 3, 1952 |